United States Patent [19]

Manly

[11] 3,763,471

[45] Oct. 2, 1973

[54] METHOD OF EDITING AN ERRONEOUS SECTION OF A MESSAGE

[76] Inventor: Ron Manly, 1922 W. El Segundo Blvd., Gardena, Calif. 90249

[22] Filed: May 1, 1972

[21] Appl. No.: 249,355

Related U.S. Application Data

[60] Division of Ser. No. 63,020, Aug. 11, 1970, Pat. No. 3,676,856, which is a continuation of Ser. No. 275,415, April 24, 1963.

[52] U.S. Cl. ................................ 340/172.5, 197/20

[51] Int. Cl. .......................... G06f 11/00, G06f 7/30

[58] Field of Search ...................... 444/1; 340/172.5, 340/146.3, 174.1; 197/20

[56] References Cited

UNITED STATES PATENTS

| | | | |
|---|---|---|---|
| 3,233,224 | 2/1966 | Foster et al. | 340/172.5 |
| 3,007,137 | 10/1961 | Page et al. | 340/172.5 |
| 3,332,617 | 7/1967 | Higonnet et al. | 234/5 |
| 2,968,383 | 1/1961 | Higonnet et al. | 197/20 |
| 2,961,644 | 11/1960 | Gardiner | 340/174 |
| 2,926,337 | 2/1960 | Rivas | 340/174 |
| 2,854,652 | 9/1958 | Smith | 340/173 |
| 2,853,696 | 9/1958 | Mendelson | 340/173 |
| 2,700,447 | 1/1955 | Blodgett | 197/20 |
| 2,379,862 | 7/1945 | Bush | 197/84 |
| 2,067,183 | 1/1937 | Green | 197/84 |
| 2,934,145 | 4/1960 | Blodgett | 197/20 X |
| 3,245,046 | 4/1966 | Bernard et al. | 340/172.5 |
| 2,967,295 | 1/1961 | Dirks | 340/172.5 |
| 3,107,342 | 10/1963 | Estrems et al. | 340/172.5 |
| 3,676,856 | 7/1972 | Manly | 340/172.5 |
| 3,426,324 | 2/1969 | Manly | 340/146.3 B |
| 3,403,225 | 9/1968 | Mislan et al. | 340/172.5 X |
| 3,328,764 | 6/1967 | Sorensen et al. | 340/172.5 |
| 3,289,176 | 11/1966 | Garth et al. | 340/172.5 |
| 3,248,705 | 4/1966 | Dammann et al. | 340/172.5 |
| 3,241,120 | 3/1966 | Amdahl | 340/172.5 |

*Primary Examiner*—Paul J. Henon
*Assistant Examiner*—Jan E. Rhoads

[57] ABSTRACT

Methods and systems to avoid manually retyping or rekeyboarding textual material when revising or correcting the information contained in a record either while originally preparing the information or at a later date. The use of print readers or character recognition devices to accomplish this "editing" is disclosed, as well as editing using paper tape typewriters, display devices, and other means such as using editing instructions. Methods are also disclosed for automatically reformatting the information into lines after insertions, deletions, or other changes requiring shifting of the line layout of the information.

17 Claims, 3 Drawing Figures

METHOD OF EDITING AN ERRONEOUS SECTION OF A MESSAGE

CROSS-REFERENCES TO RELATED APPLICATIONS

This is a division of application Ser. No. 63,020 filed Aug. 11, 1970, now U.S. Pat. No. 3,676,856, which in turn is a continuation of application Ser. No. 275,415 filed Apr. 24, 1963.

BRIEF SUMMARY OF THE INVENTION

Briefly, in one example of the present invention there is provided a manually operated typewriter having a type font which for each character makes two impressions. One of the impressions is a more or less conventional typewritten character which is man readable; and the other is a digitally encoded set of information bits which is machine readable. Alternatively, the type font may be conventionally unitary, but readable by an appropriate character reader. In either event the impression is machine readable.

The document output of this typewriter may be designated as the original record and may be a first draft of, for example, a technical paper. The author then proofreads, the original record and, with a special pen, manually makes editing marks directly onto the paper. The editing marks in this example may be of three different optically machine separable colors, and may be inserted in one of three different portions of the space allotted to a particular character, for example, above, below, or in front of the typed character. In a specific example, a vertical stroke of the editing pen in a particular color along the left hand edge of a character space may be a "start delete" edit instruction to delete what follows. A horizontal edit stroke of a different color along the top edge of the character space of a succeeding character may be an edit instruction to "stop delete." Hence, the completed instruction is to delete whatever material or blank character spaces were originally disposed between the two edit marks.

The distinction between "deleting" and "removing" should be carefully noted. The latter, applied to a typewritten page, is the removal of any printing which may occur; more generally, it is the conversion of any other character into a blank character space.

In another example, a particular edit mark or more generally stated, edit signal, may by an instruction to "insert here" material which is separately generated by the original typewriter mentioned above. In addition, "delete" and "insert," as well as other instructions, may be combined as, for example, to form a "replace" instruction.

The integrated automatic editing system of this example includes two machine readers; one for reading the original record with the manually scribed editing marks or signals thereon, and the second for reading the "insert record" which includes additional material to be inserted in the final record in accordance with the editing signals. Each of the readers is coupled to an automatic final record generator, such as an electric typewriter which is operated by electrical signals from readers and particularly, but not exclusively, from the output terminals of their respective selection matrices.

Included within the reader for the original record is an edit mark reader which observes each character space and determines whether an edit mark has been placed therein and if so, which of the three colors it is and in which portion of the space it has been scribed. The edit mark reader then interprets the edit mark and instructs the machine readers alternately to provide the desired combination of signals in proper sequence to the generator of the final record.

A novel method of on-line editing, makes use of editing commands which involve the modification of previously stored message elements. An editing system operating in conjunction with a general purpose computer, or an editing system which has other capabilities sufficient to allow the modification of previously stored message elements, such as, one or more characters, words, lines, paragraphs, or other blocks of message elements, all of which may be generically designated as "section", may be utilized. It should be noted that a section, whether a word, character, line, section, paragraph, etc., is not defined semantically, but operationally. Thus, for example, a word, as a section, means all message elements immediately preceding the editing symbol back to a blank character space, and in some embodiments including a blank character space. Thus, for example, a paragraph as a section would include all message elements back to a paragraph indicator, such as an indentation.

It should be further noted that the phrase "character sequence section" means the same as "Section" except that a character is not considered as a character sequence section by itself. It should also be noted that the phrase "message element train section," also referred to as "MET section," refers to any section which is a natural division of a message element train. The significance of this is that a line is not considered a MET section, since the length of a line is a function of the width of the hardcopy or display rather than of the message content.

This novel method uses editing symbols which indicate that the last character, word, sentence, line, paragraph, or some other message element section is to be deleted. One of the important advantages, over the prior art, of using such editing symbols is that this new method does not require the typist to backspace and delete the error by one of the methods taught by the prior art (such as, erasing, printing a delete strikeover, and the like). In this invention, the typist need only hit a selected delete key, such as one designated the "delete last character key." (Later machine steps of the method result in the error being deleted.) A typist generally learns to actuate a selected delete key without any hesitation in his typing rhythm. Thus, a considerable amount of time is saved.

As indicated, the method is applied to edit an error made during the manual typing of a record. After an error has been detected, the first step of the method is that of manually typing the appropriate editing symbol (which may, as pointed out below, consist of one or more typed edit "characters") depending upon whether the last character, word, sentence, etc., is to be deleted. For example, a "delete last character" editing symbol is typed, if a typist inadvertently types an incorrect character and detects the error before typing another character. If however, another character is typed before detecting the error, a "delete last two characters" editing symbol, which may consist of two "delete last character" editing symbols, is typed. If errors are detected somewhat later, a "delete last word" editing symbol is used. This commands the deletion of all characters starting with the last character typed and going back until a blank character space occurs. Thus, if the editing symbol appears immediately after one or more letters of a word, all of the letters will be omitted. If the editing symbol appears after one or more blank character spaces, the previous word will be deleted. A similar procedure applies to editing symbols commanding the deletion of the last line, last paragraph, etc.,; i.e., if the editing symbol occurs in the middle of the section to be deleted, the rest of the section back through its beginning is deleted; if it occurs after the completion of a section, the whole previous section will be deleted. After typing the correct primary intelligence for the section deleted, the rest of the record is typed (as well as the editing signals for any further errors which may occur). "Typing" is used here to refer to any manual keyboarding operation which produces a record.

The next step of the method is that of machine reading of the primary intelligence (and the error in the primary intelligence). The machine reading may of course be done in different ways depending upon the application. For example, the primary intelligence may be recorded on a man and machine readable record, and the record may be read by an appropriate print reader. In another example the primary intelligence may be simultaneously recorded on a man readable record and on a machine readable record. The machine readable record may be a punched paper tape, a printed paper tape, magnetic tape, punched cards and others. In examples where separate man readable and machine readable records are generated, the form of the man readable impression may be chosen primarily on the basis of facilitating the recognition of the symbol by the man and his ease of reading of messages with the symbol on it. For example, a conventional editor's delete symbol might be used for the "delete last character." When a print reader is used, the choice of editing symbols is also influenced by the capabilities of the particular reader.

The next step in the method is that of storing the primary intelligence (and the error in the primary intelligence). Any conventional computer type memory which permits direct or indirect deletion of message elements may be used.

The next step is that of detecting and interpreting the editing symbol. The detecting of the editing symbol may be accomplished by testing or examining each symbol. The editing symbol as well as the primary intelligence symbol may be stored first prior to testing to detect the editing symbol.

The next step is the deletion of the message element section previous to the editing symbol in accordance with the editing symbol. If the editing symbol also has been stored, it too must be deleted from the stored symbols.

Another novel method of on-line editing, similar to the "delete previous section" method described above, may be referred to as an "insert before previous section" method. This method is applied to the process of manual typing of a record. After the need for an insertion has been detected, the first step of the method is the manual typing of the appropriate editing symbol depending upon whether the insertion is to be made before the last character, word, sentence, line, paragraph, or the like. It should be noted that this method finds the most usefulness of application when the sections are longest. Considerations similar to those discussed earlier in connection with the use of "delete last section" editing symbols, also apply here.

The above first step is followed by the steps of: typing the insert; typing an end of insert symbol; machine reading the primary intelligence; storing the primary intelligence; detecting and interpreting the editing symbol; machine reading the insert; storing the insert; detecting and interpreting the end of insert symbol; "opening up" the primary intelligence; and inserting the insert.

The step of "opening up" the primary intelligence refers to the handling of the primary intelligence in a way that permits the insert to be inserted into the appropriate place in the message element train.

BRIEF DESCRIPTION OF THE FIGURES

Further details of these and other novel features and their principles of operation, as well as the objects and advantages will become apparent and be best understood from a consideration of the description contained in the application identified below (which is incorporated herein by reference) when taken in connection with the drawings therein.

Three of the drawings from said incorporated application are presented herein by way of example only, and in which.

Figure 1:
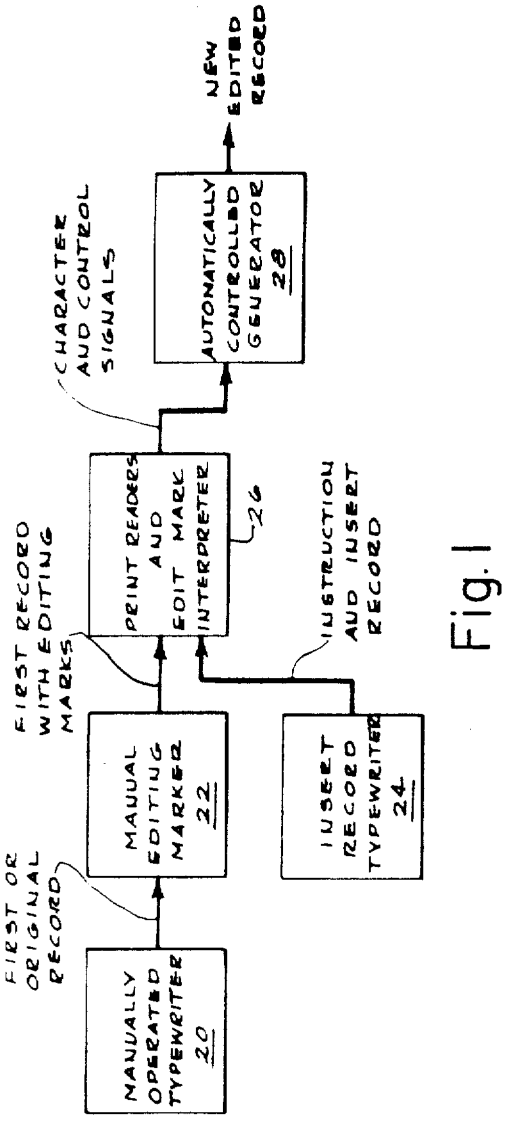
FIG. 1 is a block diagram of an example of an automatic editing system embodying the principles of the present invention.
Figure 2:
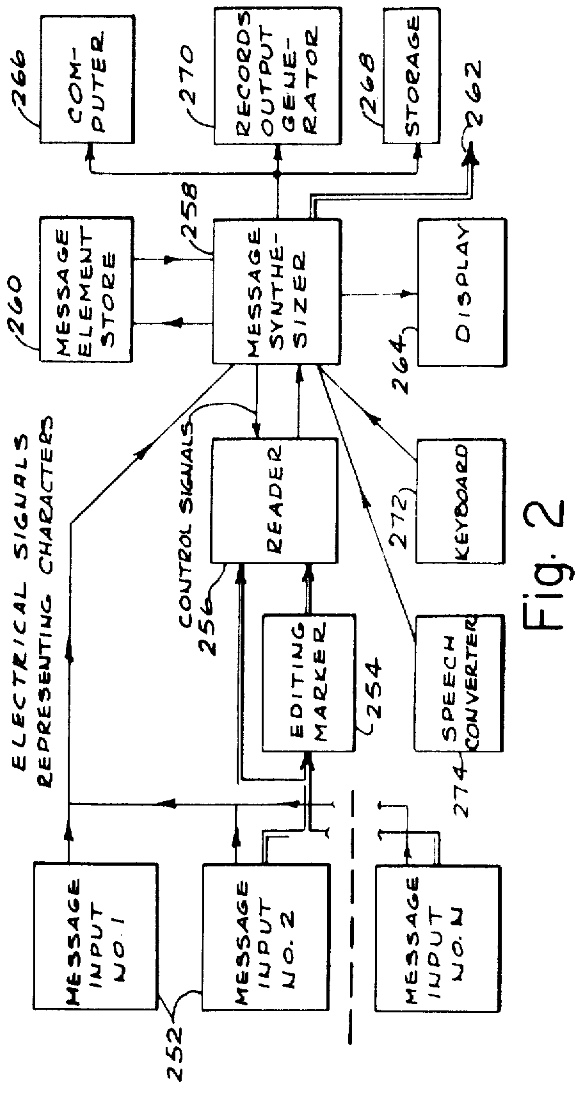
FIG. 2 is a somewhat more generalized block diagram of the system of the invention.
Figure 3:
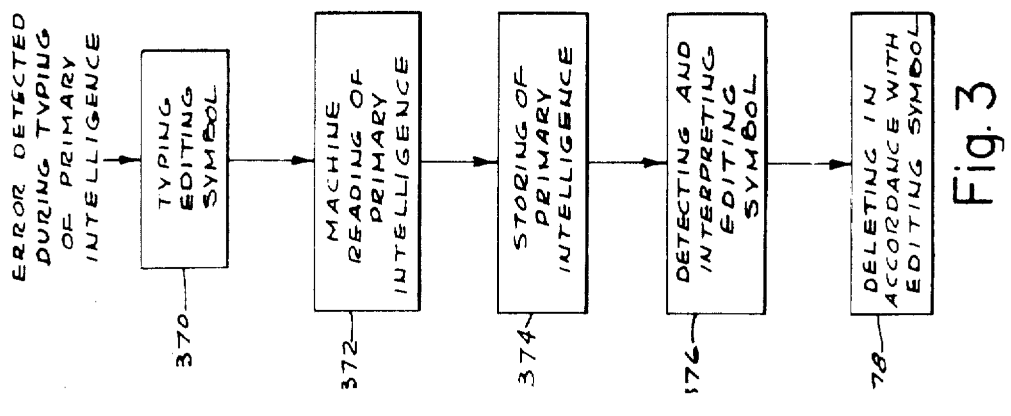
FIG. 3 is a block diagram showing an example of a "delete previous section" method of editing in accordance with the principles of the present invention.

It should be noted that FIGS. 1, 2, and 3 presented herein are identical to FIGS. 1, 12, and 14 of the referenced application of which this application is a division.

Referring to the particular Figures of the referenced application and those presented herein, it is stressed that the details shown are by way of example only and are presented in the cause of providing what is believed to be the most useful and readily understood description of the principles of the invention. The detailed showing is not to be taken as a limitation upon the scope of the invention which is to be measured by the appended claims forming a part of this specification.

IDENTIFICATION OF REFERENCED APPLICATION

The contents of application Ser. No. 63,020, filed Aug. 11, 1970, now U.S. Pat. No. 3,676,856 in its entirety is herein incorporated by reference.

What is claimed is:

1. In intelligence handling in which primary intelligence is manually keyboarded as a message, the method of editing an (error in a) erroneous section (of) in said message, commencing when the keyboarding point is at an arbitrarily selectable message element location after the keyboarding of the first character of said erroneous section, but prior to keyboarding the first character of the next section, the error being detected while keyboarding said message, comprising the steps of manually keyboarding an editing symbol on-line into (in) said message at said arbitrarily selectable message element location, immediately subsequent to said section to indicate desired deletion of said erroneous section;

machine storing in said message a signal representative of said editing symbol immediately subsequent to said manual keyboarding of said editing symbol;

machine detecting and interpreting said editing symbol in said message; and machine deleting said erroneous section in accordance with the interpretation of said editing symbol.

2. Method of editing according to claim 1 in which said message is recorded on a record during the typing of said record.

3. In intelligence handling in which primary intelligence is manually keyboarded as a message, the method of editing an error in a MET section of said message, commencing when the keyboarding point is at an arbitrarily selectable message element location after the keyboarding of the first character of said erroneous section, but prior to keyboarding the first character of the next section, the error being detected while keyboarding a particular kind of MET section in said message, comprising the steps of manually keyboarding an editing symbol on-line into said message at said arbitrarily selectable message element location, immediately subsequent to said particular kind of MET section to indicate desired deletion of said MET section machine storing in said message a signal representative of said editing symbol immediately subsequent to said manual keyboarding of said editing symbol;

machine detecting and interpreting said editing symbol in said message; and machine deleting said MET section in accordance with the interpretation of said editing symbol.

4. In intelligence handling in which primary intelligence is manually keyboarded as a message, the method of editing an error in a word of said message, commencing when the keyboarding point is at an arbitrarily selectable message element location after the keyboarding of the first character said erroneous word, but prior to keyboarding the first character of the next section, the error being detected while keyboarding said message, comprising the steps of manually keyboarding an editing symbol on-line into said message at said arbitrarily selectable message element location, immediately subsequent to said word to indicate desired deletion of said word;

machine storing in said message a signal representative of said editing symbol immediately subsequent to said manual keyboarding of said editing symbol;

machine detecting and interpreting said editing symbol in said message; and machine deleting said word in accordance with the interpretation of said editing symbol.

5. In intelligence handling in which primary intelligence is manually keyboarded as a message, the method of editing an error in a section of said message, commencing when the keyboarding point is at an arbitrarily selectable message element location after the keyboarding of the first character of said erroneous section, but prior to keyboarding the first character of the next section, the error being detected while keyboarding said message, comprising the steps of manually keyboarding an editing symbol on-line into said message at said arbitrarily selectable message element location, immediately subsequent to said section to indicate desired deletion of said section;

machine storing in said message a signal representative of said editing symbol immediately subsequent to said manual keyboarding of said editing symbol;

machine printing on a hardcopy record in the location immediately subsequent to said erroneous section, said editing symbol in a man readable form indicative of the desired deletion of said erroneous section in response to the generation of said editing symbol;

machine detecting and interpreting said editing symbol in said message; and machine deleting said section in accordance with the interpretation of said editing symbol.

6. In an intelligence handling system in which primary intelligence is manually keyboarded as a message, said system having a keyboard containing keys which may be manually actuated for keyboarding symbols indicating primary intelligence and desired editing modifications, and a means of storing information coupled to said keyboard for storing a coded pattern from a font of patterns to represent each of said symbols indicating primary intelligence and desired editing modifications, machine said keyboard including a delete key whose actuation causes the generation of an editing symbol which indicates the desired deletion of the immediately preceding message elements of the current character sequence section (of information) stored in said means of storing information, the method of editing an erroneous character sequence section in said message, the (erroneous) section being detected as erroneous prior to completion of keyboarding of said sequence (immediately following) section, and comprising the steps of:

manually keyboarding said editing symbol on-line into said message by actuating said delete key immediately subsequent to the keyboarding of said message elements; (erroneous section;)

simultaneously generating a coded pattern from said font of patterns to represent said editing symbol indicative of desired deletion of said message elements (erroneous section) in response to said actuating of said delete key;

machine storing said coded pattern representative of said editing symbol in said message in said means for storing in response to the generation of said coded pattern of said editing symbol, and immediately subsequent to the actuation of said delete key;

manually keyboarding the correct primary intelligence to replace said (erroneous section;) message elements;

machine detecting and interpreting said coded pattern representative of said editing symbol; and machine providing a message element train representative of said intelligence of said message as modified in response to said editing symbol and in accordance with the interpretation of said editing symbol.

7. The method of editing in a message according to claim 6 in which said means of storing information includes message element locations in which coded patterns representative of said symbols are consecutively stored, and in which said step of machine storing of the coded pattern of said editing symbol is performed by storing said coded pattern in the immediately following message element location in said means of storing information.

8. In an intelligence handling system in which primary intelligence is manually keyboarded as a message, said system having a keyboard containing keys which may be manually actuated for keyboarding symbols indicating primary intelligence and desired editing modifications, and a means of storing information coupled to said keyboard for storing a coded pattern from a font of patterns to represent each of said symbols indicating primary intelligence and desired editing modifications, said means of storing information includes message element locations in which coded patterns representative of said symbols are consecutively stored, said keyboard including a delete key whose actuation causes the generation of an editing symbol which indicates the desired deletion of the immediately preceding character stored in said means of storing information, the method of editing an erroneous character in said message, the erroneous character being detected prior to key-boarding the immediately following character, and comprising the steps of:

manually keyboarding said symbol on-line by actuating said delete key immediately subsequent to the keyboarding of said erroneous character;

simultaneously generating a coded pattern from said font of patterns to represent said editing symbol indicative of desired deletion of the immediately preceding character in response to said actuating of said delete key;

machine storing said coded pattern representative of said editing symbol in said means for storing in response to the generation of said coded pattern of said editing symbol and immediately subsequent to the actuation of said delete key, said step of machine storing of the coded pattern of said editing symbol is performed by storing said coded pattern in the immediately following message element location in said means of storing information ;

manually keyboarding the correct character to replace said erroneous character;

machine detecting and interpreting said coded pattern representative of said editing symbol; and machine providing a message element train representative of said intelligence of said message as modified in response to said editing symbol and in accordance with the interpreation of said editing symbol.

9. The method of editing an erroneous character in a message according to claim 8 in which said step of machine storing of the coded pattern of said editing symbol is performed by recording said coded pattern representative of said editing symbol on a record in the immediately following message element location in said record in response to the generation of said coded pattern of said editing symbol.

10. The method of editing an erroneous character in a message according to claim 8 in which said step of machine storing is performed by machine punching on a paper tape said coded pattern representative of said editing symbol in the immediately following message element location on said paper tape in response to the generation of said coded pattern of said editing symbol.

11. The method of editing an erroneous character in a message according to claim 8 in which said step of machine storing includes machine printing on a hardcopy record in the location immediately subsequent to said erroneous section, a man readable editing symbol indicative of the desired deletion of said erroneous character in response to the generation of said editing symbol; and in which said method also includes the step of machine printing on said hardcopy in the location immediately subsequent to said editing symbol, the correct primary intelligence symbol in response to the keyboarding of said correct character symbol.

12. The method of editing an erroneous character in a message according to claim 8 in which said step of machine storing includes machine printing on a man-machine readable hardcopy record in the location immediately subsequent to said erroneous character, a man-machine readable editing symbol indicative of the desired deletion of said erroneous character in response to the generation of said editing symbols; and in which said method also includes the step of machine printing on said man-machine readable record in the location immediately subsequent to said editing symbol, the correct primary intelligence man-machine readable symbol in response to the keyboarding of said correct character symbol.

13. The method of editing an erroneous character in a message according to claim 11 in which said method also includes the additional steps of generating a machine readable editing symbol on a machine readable record indicative of the desired deletion of said erroneous character in response to the generation of said editing symbol; and generating a machine readable primary intelligence symbol on said machine readable record indicative of the correct primary intelligence symbol in response to the keyboarding of said correct symbol.

14. The method of editing an erroneous character in a message according to claim 8 in which said step of machine storing is performed by storing said coded pattern representative of said editing symbol in a message element store in the immediately following message element location in response to the generation of said coded pattern of said editing symbol.

15. The method of editing an erroneous character in a message according to claim 14 in which said method also includes the additional step of machine printing on a hardcopy record in the location immediately subsequent to said erroneous section, a man readable editing symbol indicative of the desired deletion of said erroneous character in response to the generation of said editing symbol.

16. The method of editing an erroneous character in a message according to claim 15 in which said step of machine detecting and interpreting said editing symbol is performed immediately subsequent to said generating of the editing symbol;

in which said step of machine detecting is immediately followed by the step of deleting said erroneous character and said editing symbol from said message element store;

in which said step of manual keyboarding of the correct primary intelligence comprises keyboarding the correct character; and which immediately following said step of manual keyboarding of the correct character includes the step of machine storing a coded pattern representative of said correct character in the memory element location in which said erroneous character was previously stored.

17. The method of editing an erroneous character in a message according to claim 14 in which said step of providing a message element train includes the additional step of displaying a message element train on a display.

* * * * *